US012188626B1

(12) United States Patent
Lei et al.

(10) Patent No.: US 12,188,626 B1
(45) Date of Patent: Jan. 7, 2025

(54) ANTIQUE LED LAMP SIMULATING OIL LAMP FLAME AND STRING LAMP

(71) Applicants: Guangdong Jiaduowang Lighting Tech Co., Ltd, Guangdong (CN); Dongguan Miray E-Tech Co., Ltd, Dongguan (CN)

(72) Inventors: Jianwen Lei, Dongguan (CN); Ziyang Lei, Dongguan (CN)

(73) Assignees: Guangdong Jiaduowang Lighting Tech Co., Ltd, Guangdong (CN); Dongguan Miray E-Tech Co., Ltd., Dongguan (CN)

( * ) Notice: Subject to any disclaimer, the term of this patent is extended or adjusted under 35 U.S.C. 154(b) by 0 days.

(21) Appl. No.: 18/453,256

(22) Filed: Aug. 21, 2023

(30) Foreign Application Priority Data

Jul. 26, 2023 (CN) ......................... 202321978483.3

(51) Int. Cl.
*F21S 4/10* (2016.01)
*F21S 10/04* (2006.01)
*F21Y 115/10* (2016.01)

(52) U.S. Cl.
CPC ................. *F21S 4/10* (2016.01); *F21S 10/04* (2013.01); *F21Y 2115/10* (2016.08)

(58) Field of Classification Search
CPC .................................... F21S 4/10; F21S 10/04
See application file for complete search history.

(56) References Cited

U.S. PATENT DOCUMENTS

| | | | | |
|---|---|---|---|---|
| 10,683,972 | B1 * | 6/2020 | Hsu | F21S 10/043 |
| 11,608,952 | B2 * | 3/2023 | Patton | F21V 3/049 |
| 2013/0050995 | A1 * | 2/2013 | Hsu | F21L 19/00 362/181 |
| 2016/0327227 | A1 * | 11/2016 | Green, Jr. | F21V 23/026 |
| 2017/0122550 | A1 * | 5/2017 | Sculler | F21V 33/0028 |
| 2019/0338900 | A1 * | 11/2019 | Benninghoff | F21L 27/00 |
| 2024/0019087 | A1 * | 1/2024 | Jiang | H01L 25/0753 |

FOREIGN PATENT DOCUMENTS

| | | | |
|---|---|---|---|
| CN | 207279335 | U | 4/2018 |
| CN | 207740781 | U | 8/2018 |
| CN | 212480882 | U | 2/2021 |
| CN | 212480893 | U | 2/2021 |
| CN | 214948657 | U | 11/2021 |

* cited by examiner

*Primary Examiner* — Christopher E Dunay

(57) ABSTRACT

An antique LED lamp simulating an oil lamp flame includes a lamp holder, a bulb, and a main frame, and the bulb and the lamp holder are arranged in the main frame, the bulb is rotatably mounted on a bottom of the lamp holder, and the lamp holder is electrically connected with the bulb, a wire passes the main frame to electrically connected with the lamp holder, the LED flame emitting plate is arranged in the bulb and is connected to a control chip, and the control chip is internally provided with an IC program, and the IC program adjusts the light emitting frequency and brightness of the LED emitting plate to simulate flickering and emitting light like flames. The antique LED lamps in the present invention can not only illuminate but also simulate the flickering and swaying effect of the oil lamp flame, creating a good atmosphere.

9 Claims, 8 Drawing Sheets

ANTIQUE LED LAMP SIMULATING OIL LAMP FLAME AND STRING LAMP

FIELD OF THE INVENTION

The present invention relates to the technical field of lighting products, particularly, to an antique led lamp simulating an oil lamp flame and a string lamp.

BACKGROUND OF THE INVENTION

A kerosene lamp, also known as an oil lamp, uses kerosene as a main light oil, cooperated with a core, covered with a glass cover on the outside to prevent fire from igniting objects around the same or wind and rain from extinguishing the lamp. When the user is running with a horse at night, the kerosene lamp can be hung on the horse, for example, American cowboy placed the kerosene lamp on the side of a saddle for lighting. The kerosene lamp is widely used only when coming into China at late Qing dynasty and early republic of China. In the prior art, by replacing the light oil light, the core and the glass cover with a bulb, the light source of the bulb is more stable, and real-time kerosene addition is not required for the bulb, thereby being more time-saving and labor-saving in use. During use, the bulb does not fall over or is subject to risks due to other external factors, and is safer in daily use.

For example, Chinese Utility Model patent CN217684500U discloses a new type of oil lamp, including a lamp cover, a lampshade, and a base, arranged from top to bottom. The lamp cover is equipped with an LED lamp circuit board, the lampshade is internally equipped with a guiding light column, and the base is equipped with a power supply. The power supply is connected to the LED lamp circuit board as the light source of the oil lamp, solving the technical problems of using kerosene and low brightness of the kerosene lamp, which cannot meet the needs of users.

However, the existing oil lamp is mostly used for outdoor camping or outdoor decoration, which has not only a lighting function but also a resistance to wind and rain, but also a decoration function to create an atmosphere. In particular, after parts such as an LED lamp and a bulb therein are damaged, they can be conveniently and timely replaced, thereby really achieving an energy-saving effect.

SUMMARY OF THE INVENTION

The object of the present invention is to provide an antique led lamp simulating an oil lamp flame and string lamp with the same, which can not only illuminate but also simulate the flickering and swaying flames effect of the oil lamp flames. It is suitable for decoration and creating an atmosphere, and is easy to disassemble and replace parts.

In order to achieve the above object, the present invention provides an antique LED lamp simulating the oil lamp flame, which includes a LED light-emitting plate, a lamp holder, a bulb, and a main frame. The bulb and the lamp holder are arranged in the main frame, the bulb is rotatably mounted on the bottom of the lamp holder, and the lamp holder is electrically connected with the bulb. A wire passes the main frame to be electrically connected to the lamp holder. The LED flame-emitting plate is arranged in the bulb and is connected to a control chip. The control chip is internally provided with an IC program, and the IC program adjusts the light emitting frequency and brightness of the LED emitting plate to simulate flickering and emitting light like flames.

Two assembling frames are spliced in a mirror-symmetrical manner to form the main frame; each of the two assembling frames comprises a half top cover, a half base and two half connection rods; the two half connection rods are symmetrically arranged at two sides of the half base and the half top cover to connect the half base and the half top cover; after the two assembling frames are assembled, the two half top covers are assembled to form a top cover of the main frame, the two half bases are assembled to form the base of the main frame, and the four half connection rods are assembled in pairs to form two connection rods of the main frame; the lamp holder is mounted in the top cover, and a bottom of the bulb is located an upper part of the base of the main frame.

A bottom surface of the top cover is provided with a mounting slot, a top surface thereof is provided with a wire hole communicated with the mounting slot, and the lamp holder is mounted in the mounting slot.

The top surface of the top cover is provided with a groove for sealing and injecting glue, and the wire hole is located inside the groove.

An inner wall of the mounting slot is provided with multiple positioning slots at intervals, an outer wall of the lamp holder is provided with positioning bump at intervals, and the positioning bump respectively snap-fitted with the positioning slots.

The two half top covers are integrally formed by injection molding to form the top cover, a fixing piece is arranged between two top parts of the two half connection rods of the same assembling frame, and the two fixing pieces attached to an outer surface of the top cover.

The outer surface of the top cover is provided with a closed clamping slot, and two of the fixing pieces are clamped in the closed clamping slot.

Each of the two assembling frames further comprises a limiting strip, being connected to the two half connecting rods; the limiting strip comprises two half-abutting portions and an arc portion; the two half-abutting portions are respectively connected to the two half connecting rods, and the arc portion is connected to the two half-abutting portions; after the two assembling frames are assembled, the two half-abutting portions of the two assembling frames are spliced together side by side, the two arc-shaped portions are spliced together into an annular ring, and the annular ring positions the bulb around a maximum outer diameter of the bulb.

An upper portion of each of the two half connecting rods is provided with a half through hole, after the four half connecting rods are assembled in pairs, the four half through holes are butt-jointed in pairs to form two through-holes; and the two through-holes are used for two ends of a handle to pass through and are connected to the handle.

The bulb has a thread base, the inner surface of the lamp holder is provided with an inner thread matched with the thread base.

The present invention also provides a string lamp with multiple of the aforementioned antique LED lamp simulating the oil lamp flame.

The string lamp includes multiple of the aforementioned antique LED lamps simulating the oil lamp flame which are connected with a wire. The wire is electrically connected with a power supply switch to control all of the antique LED lamps to turn on and off and the light emitting frequency and brightness thereof.

The above one or more technical solutions in the antique LED lamps simulating the oil lamp flame provided by the embodiments in the present invention have at least one of the following technical effects:

The antique LED lamp simulating the oil lamp flame in the present invention includes the lamp holder, the bulb, and the main frame, and the bulb and the lamp holder are arranged in the main frame, and the bulb is rotatably mounted on the bottom of the lamp holder, and the lamp holder is electrically connected with the bulb, the wire passes the main frame to electrically connected with the lamp holder, the LED flame emitting plate is arranged in the bulb and is connected to a control chip, and the control chip is internally provided with an IC program, and the IC program adjusts the light emitting frequency and brightness of the LED emitting plate to simulate flickering and emitting light like flames. With the above structure, the antique LED lamps in the present invention can not only illuminate but also simulate the flickering and swaying effect of the oil lamp flames, flashing and swaying, bright and moving, creating a good atmosphere. At the same time, the lamp holder and bulb are placed in the main frame to shield the lamp holder and bulb from wind and rain, prevent water mist from entering the lamp holder and damaging the LED light-emitting plate. The lamp holder and the bulb are directly assembled and replaced by rotary installation, and it is convenient and fast.

The main frame is formed by the two assembling frames which are spliced together in a mirror-symmetrical manner. The assembling and disassembling are convenient, and damaged parts, such as the bulb and the lamp holder, can be easily replaced, thereby achieving the purpose of energy conservation and environmental protection.

BRIEF DESCRIPTION OF THE DRAWINGS

In order to more clearly illustrate the technical schemes in the embodiments in the present invention, the drawings needed in the embodiments or the prior technical description are simple introduced below, obviously, the drawings described below are only some embodiments in the present invention, and for those skilled in the art, additional drawings may be obtained without creative labor.

Figure 1:
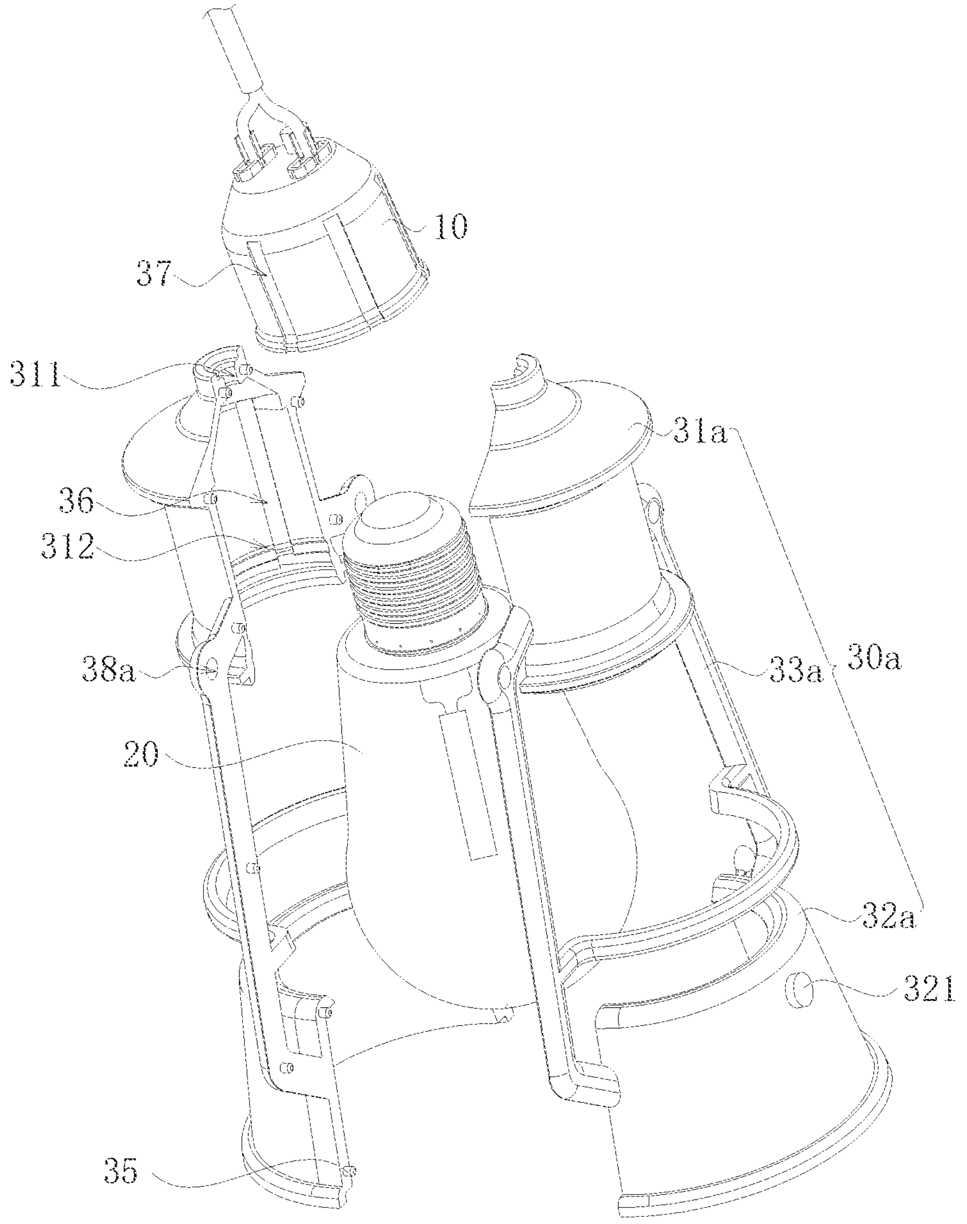
FIG. 1 is an exploded view of the antique LED lamps simulating the oil lamp flame according to an embodiment in the present invention.

Wherein the reference numbers are as follows:

10. the lamp holder; 20. the bulb;
21. the LED light-emitting plate; 211. the control chip;
30. the main frame; 31. the top cover;
32. the base of the main frame; 33. the connection rods;
34. the fixing slot; 35. the positioning bulge;
36. the positioning slots; 37. the positioning bump;
38. the through hole; 39. the fixing piece;
40. the wire; 311. the wire hole;
312. the mounting slot; 313. the groove;
314. the fixed plastic stopper; 321. the adjusting switch;
322. the decoration piece; 323. the handle;
331. the limiting strip; 30*a*. the assembling frame;
30*b*. the assembling frame; 31*a*. the half top cover;
31*b*. the clamping slot; 32*a*. the half base;
32*b*. the half base; 33*a*. the half connecting rod;
33*b*. the half connecting rod; 38*a*. the through hole;
331*a*. the abutting portions; 332*b*. the arc-shaped portion.

EMBODIMENTS

Embodiments of the present invention are described in detail below, and examples of the embodiments are shown in the attached drawings, in which the same or similar labels represent the same or similar elements or elements with the same or similar function. The embodiments described below by reference to the attached drawings are exemplary and are intended to explain embodiments of the present invention and cannot be understood as limits in the present invention.

In the description of the embodiments of the present invention, it should be understood that if the embodiments involve directional indications, such as the "upper", "lower", "left", "right", "front", "rear", "internal" and "external", etc. indicating orientation or location relationship, is based on the orientation or position relationship shown in the figures, it is only for describing the embodiments in the present invention and simplifying the description, rather than indicating or implying the device or the element that must have a specified azimuth, constructed and operated, it cannot be understood as a limitation on the present invention.

Further, the terms "first", and "second" are used only for description purposes, and cannot be understood as indicating or implying relative importance or implicitly indicating the number of technical features indicated. Thus, features defining "first "and "second" may expressly or implicitly include one or more of the features. In the description of the embodiments of the present invention, the "plurality of" means two or more unless otherwise specifically limited.

In the embodiments of the present invention, unless otherwise specified and defined, the terms "installation", "connection", "connection", "fixation" and other terms shall be understood in a broad sense, for example, they can be fixed connection, detachable connection, or integrated; It may be a mechanical connection or an electrical connection; It can be directly connected or indirectly connected through an intermediate medium. It can be the connection between two elements or the interaction between two elements. For those skilled in the art, the specific meanings of the above terms in the embodiments of the present invention can be understood according to specific circumstances.

In an embodiment in the present invention, referring to FIGS. 1-7, an antique LED lamp simulating the oil lamp flame includes a lamp holder 10, a bulb 20, and a main frame 30.

Two assembling frames 30*a* are spliced in a mirror-symmetrical manner to form the main frame 30. The spliced faces of the two assembling frames 30*a* are respectively provided with fixing slots 34 and positioning bulges 35, the assembly of the main frame 30 is achieved by the cooperation connection of the fixing slots 34 and the positioning bulges 35. The two assembling frames 30*a* clamp the lamp holder 10 and the bulb 20 in the main frame 30. The bulb is rotatably mounted at the bottom of the lamp holder 10, and the lamp holder 10 is electrically connected to the bulb 20. A wire 40 passes through the main frame 30 to be electrically connected with the lamp holder 10. The LED light-emitting plate 21 is arranged in the bulb 20 and is connected to a control chip 211. The control chip 211 is internally provided with an IC program, and the IC program adjusts the light emitting frequency and brightness of the LED light-emitting plate 21 to simulate flickering and emitting light like flames. The bulb 20 is made from transparent material, and the main frame 30 protects the bulb 20 and the LED light-emitting plate 21 therein, so as to avoid damage when the antique LED lamp is used outdoors.

Figure 5:
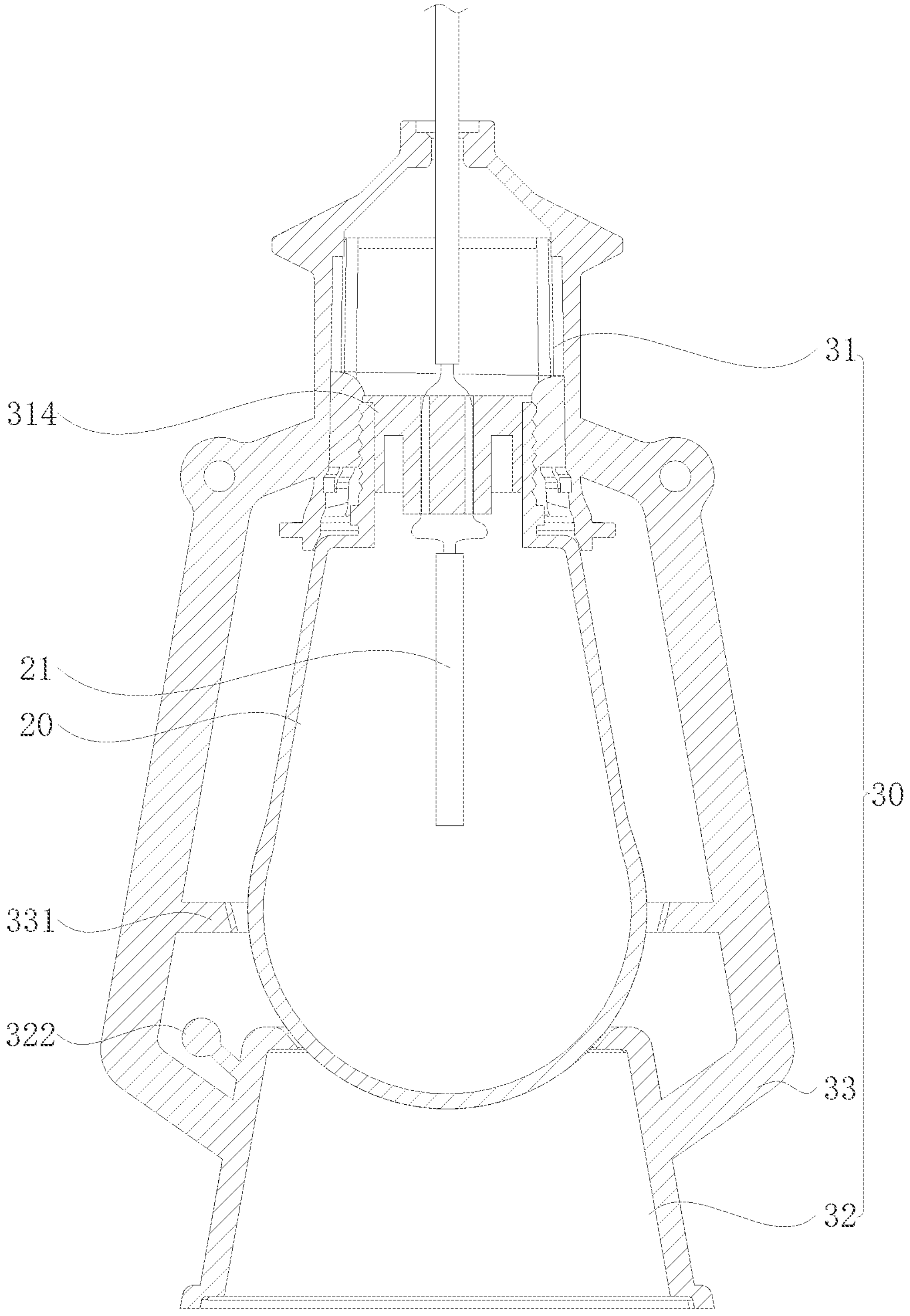
FIG. 5 is an in-section view of the antique LED lamps simulating the oil lamp flame according to the other embodiment in the present invention.
Figure 6:
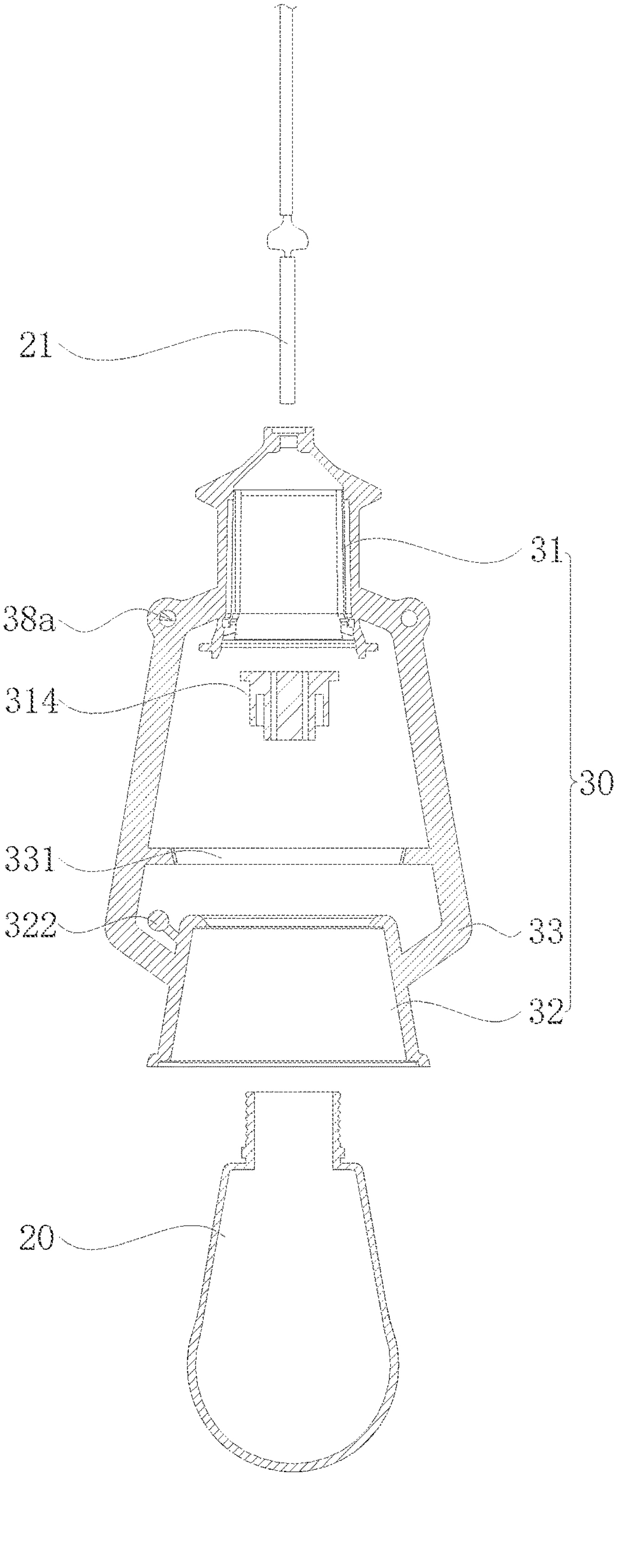
FIG. 6 is an exploded view of FIG. 5.

Referring to FIGS. 5-6, the antique LED lamp simulating the oil lamp flame is equipped with the fixed plastic stopper 314 at an opening of the bulb 20. A positive electrode and the negative electrode of the LED light-emitting plate 21 pass through the fixed plastic stopper 314 to directly connect with the wire 40. The LED light-emitting plate 21 is arranged in the bulb 20. the bulb 20 is directly clamped with the main frame 30, that is to say, when the two assembling frames 30*a* are assembled, they clamp a protrusion edge of an outer surface of the opening of the bulb 20. And the fixed plastic stopper 314 has the function of sealing and waterproofing the inner cavity of the bulb 20.

According to an embodiment in the present invention, in the antique LED lamp simulating the oil lamp flame, the bulb 20 is fixed below the lamp holder 10. The lamp holder 10 is fixed between the two assembling frames 30*a*, the two assembling frames 30*a* are assembled, the top of the main frame 30 is formed a wire hole 311, the wire 40 passes through the wire hole 311 and extends into the main frame 30 to connect the lamp holder 10, the bulb 20 is electrically connected to the lamp holder 10. The bulb 20 is internally provided with the LED light-emitting plate 21, after the circuit is connected, the LED light-emitting plate 21 can simulate the flickering and emitting of flames.

The LED light-emitting plate 21 is required to achieve the effect of a true flame of a traditional oil lamp, so that a viewer has a sense of true flame, firstly, a control chip 211 having a driving function must be constructed, an IC program is built therein, and a light emitting frequency and brightness are adjusted via the IC program, so that the light source flicks naturally as a real flame, and at the same time, it is ensured that the antique LED lamp simulating the oil lamp flame in the present application is energy-saving and pollution-free, thus achieves the best effect of energy conservation and environmental protection.

In another embodiment in the present invention, referring to FIGS. 1-4, each of the two assembling frames 30*a* comprises a half top cover 31*a*, a half base 32*a* and two half connection rods 33*a*; the two half connection rods 33*a* are symmetrically arranged at two sides of the half base 32*a* and the half top cover 31*a* to connect the half base 32*a* and the half top cover 31*a*; after the two assembling frames 30*a* are assembled, the two half top covers 31*a* are assembled to form a top cover 31 of the main frame 30, the two half bases 32*a* are assembled to form the base 32 of the main frame 30, and the four half connection rods 33*a* are assembled in pairs to form two connection rods 33 of the main frame 30; the top cover 31 is formed the mounting position of the lamp holder 10 and the lamp holder 10 is mounted in the top cover 31, the base 32 of the main frame 30 is used for positioning the bottom of the bulb 20. The two connection rods 33 support the whole main frame 30. The lamp holder 10 is arranged in the top cover to shield from wind and rain, prevent water mist from entering the bulb 20 to damage the LED light-emitting plate 21. By providing the assembling frames 30*a*, the antique LED lamp simulating the oil lamp flame looks beautiful, is easy to assemble and disassemble, and is convenient to replace damaged parts.

The LED light-emitting plate 21 is sleeved with a sleeve (not shown in the figure) for dispersing a light source so as to increase the light-emitting area thereof, thereby improving the light-emitting effect.

In another embodiment in the present invention, referring to FIGS. 1-4, the top cover 31 of the main frame 30 is formed a wire hole 311 and a mounting slot 312, and the mounting slot 312 is communicated with the wire hole 311. The wire hole 311 is used for the wire 40 to pass through and connect to the lamp holder 10. The mounting slot 312 is used for fixing the lamp holder 10. By the communication of the mounting slot 312 and the wire hole 311, it ensures the wire 40 can be connected with the lamp holder 10 mounting in the mounting slot 312.

In another embodiment in the present invention, referring to FIGS. 1-4, the top cover 31 is also provided with a groove 313 for sealing and injecting glue, and the wire hole 311 is located inside the groove 313. By arranging the groove 313 on the top of the top cover 31 for scaling and injecting glue, it ensures the gap between the wire 40 and the wire hole 311 is sealed.

In another embodiment in the present invention, referring to FIGS. 1-4, the inner wall of the mounting slot 312 is provided with multiple positioning slots 36 at intervals, an outer wall of the lamp holder 10 is provided with positioning bump 37 at intervals, the positioning bump 37 are respectively snap-fitted with the positioning slots 36. On the one hand, it ensures the positioning and installation of the lamp holder 10, and on the other hand, it prevents the lamp holder 10 from being loose in assembly. Or, the inner wall of the mounting slot 312 is provided with positioning bump 37, and the outer wall of the lamp holder 10 is provided with positioning slots 36. The structure enables the lamp holder 10 to be stably installed.

Figure 8:
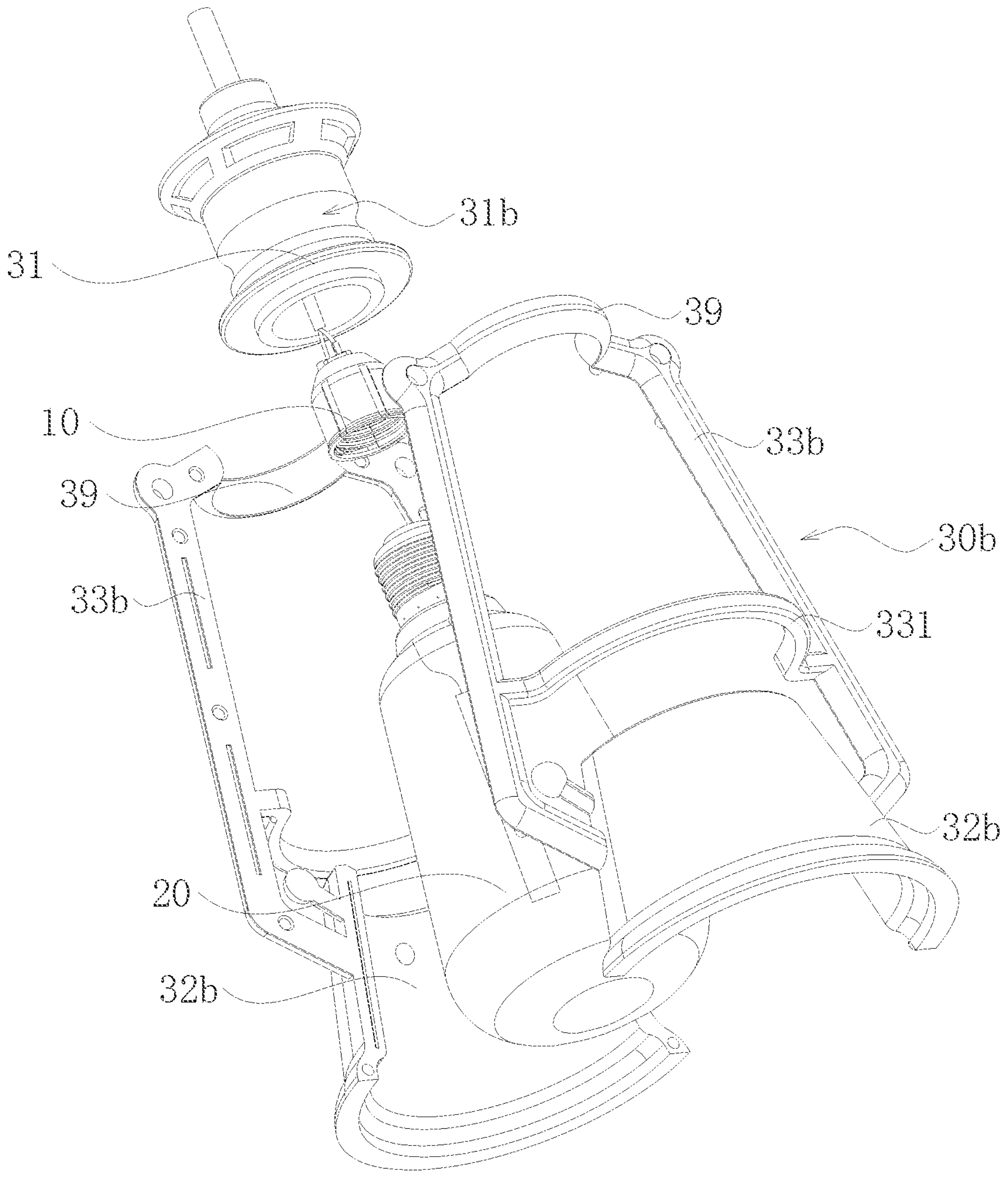
FIG. 8 is an exploded view of the antique LED lamps simulating the oil lamp flame according to another embodiment in the present invention.

In another embodiment in the present invention, referring to FIG. 8, the assembling frame 30*b* has no the half top cover 31*a*, and instead, the top cover 31 of the main frame 30 is integral by means of an injection molding process, so that the top cover 31 has better waterproof performance, and is more secure. A fixing piece 39 is arranged between the two top portions of the two half connection rods 33*b* of the same assembling frame 30*b*, the lamp holder 10 is mounted in the top cover 31, the bulb 20 is mounted in the lamp holder 10. The two fixing pieces 39 attached to the outer surface of the top cover 31. The two fixing pieces 39 are enclosed and fastened on the top cover 31, so that the top cover 31, the two half connecting rods 33*b* and the two half bases 32*b* are combined to form the main frame 30; the outer surface of the top cover 31 is provided with a closed clamping groove 31*b*, and the fixing piece 39 is clamped in the clamping groove 31*b*.

In another embodiment in the present invention, referring to FIGS. 1-4, each of the two assembling frames 30*a* further comprises a limiting strip 331, being connected to the two half connecting rods 33*a*; the limiting strip 331 comprises two half-abutting portions 331*a* and an arc portion 331*b*; the two half-abutting portions 331*a* are respectively connected to the two half connecting rods 33*a*, and the arc portion 331*b* is connected to the two half-abutting portions 331*a*. After the two assembling frames 30*a* are assembled, the two half-abutting portions 331 of the two assembling frames 30*a* are spliced together side by side, the two arc-shaped portions 331*b* are spliced together into an annular ring, and the annular ring positions the bulb 20 around a maximum outer diameter of the bulb 20. Preferably, the half-abutting portions 331*a* ensure the two limiting strips 331 can be completely arranged around the periphery of the bulb 20 without a gap. The bending direction of the arc portion 331*b* is the same as the bending direction of the outer surface of the base 32, and the limiting strip 331 is closely attached to the surface of the bulb 20. By means of the arrangement of the arc portion 331*b*, the two limiting strips 331 can be closely attached to the outer surface of the bulb 20, thereby realizing the positioning of the bulb 20 and preventing the bulb 20 from being damaged due to rocking under wind and rain.

In another embodiment in the present invention, referring to FIGS. 1-4, an upper portion of each of the two half connecting rods 33*a* is provided with a half through hole 38*a*, after the four half connecting rods 33*a* are assembled in pairs, the four half through holes 38*a* are butt-jointed in pairs to form two through-holes 38; and the two through-holes 38 are used for two ends of a handle 323 to pass through and are connected to the handle 323, thereby convenient to take or hang the antique LED lamp simulating the oil lamp flame.

Figure 2:
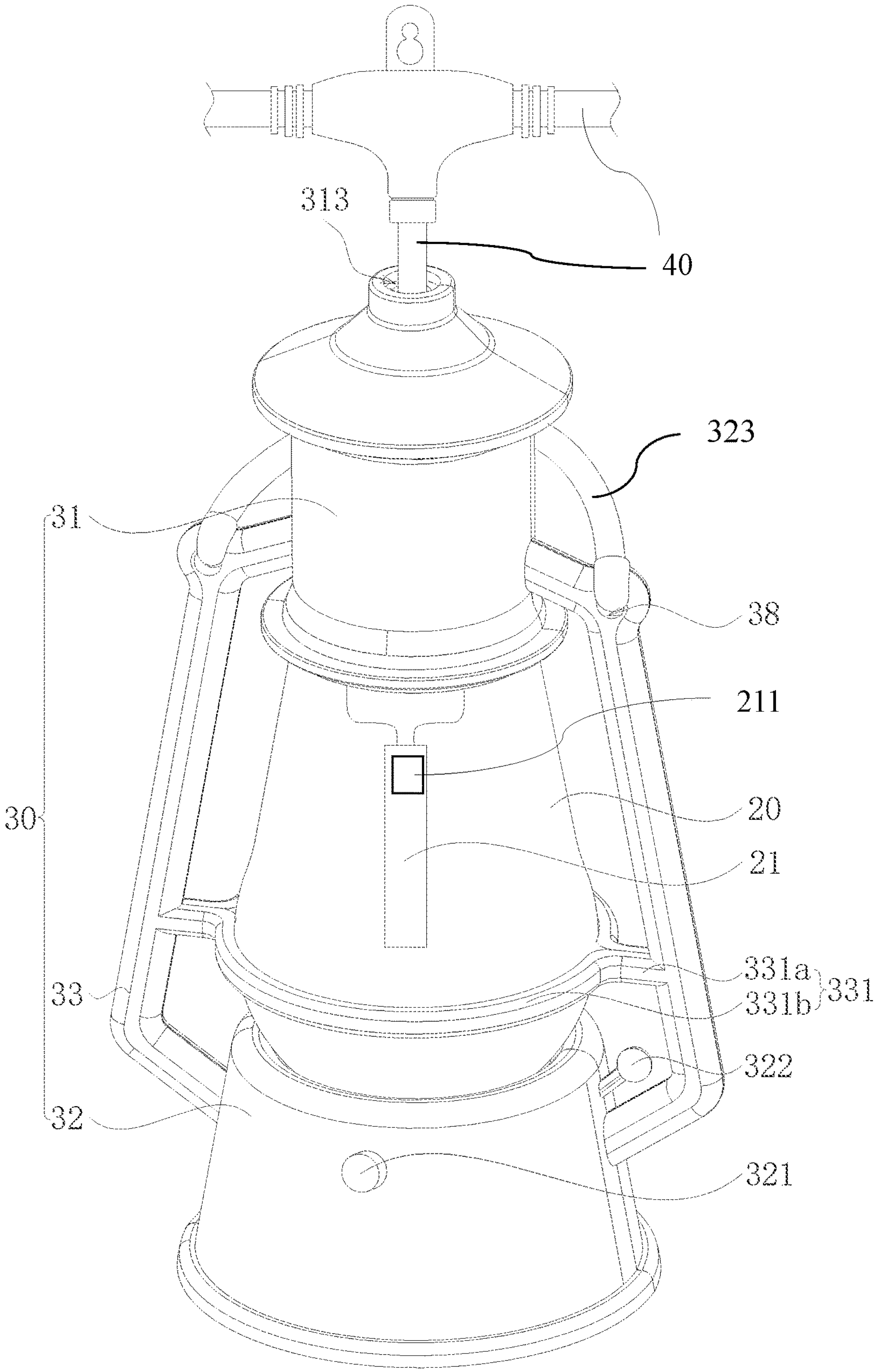
FIG. 2 is a perspective view of the antique LED lamps simulating the oil lamp flame according to an embodiment in the present invention.
Figure 3:
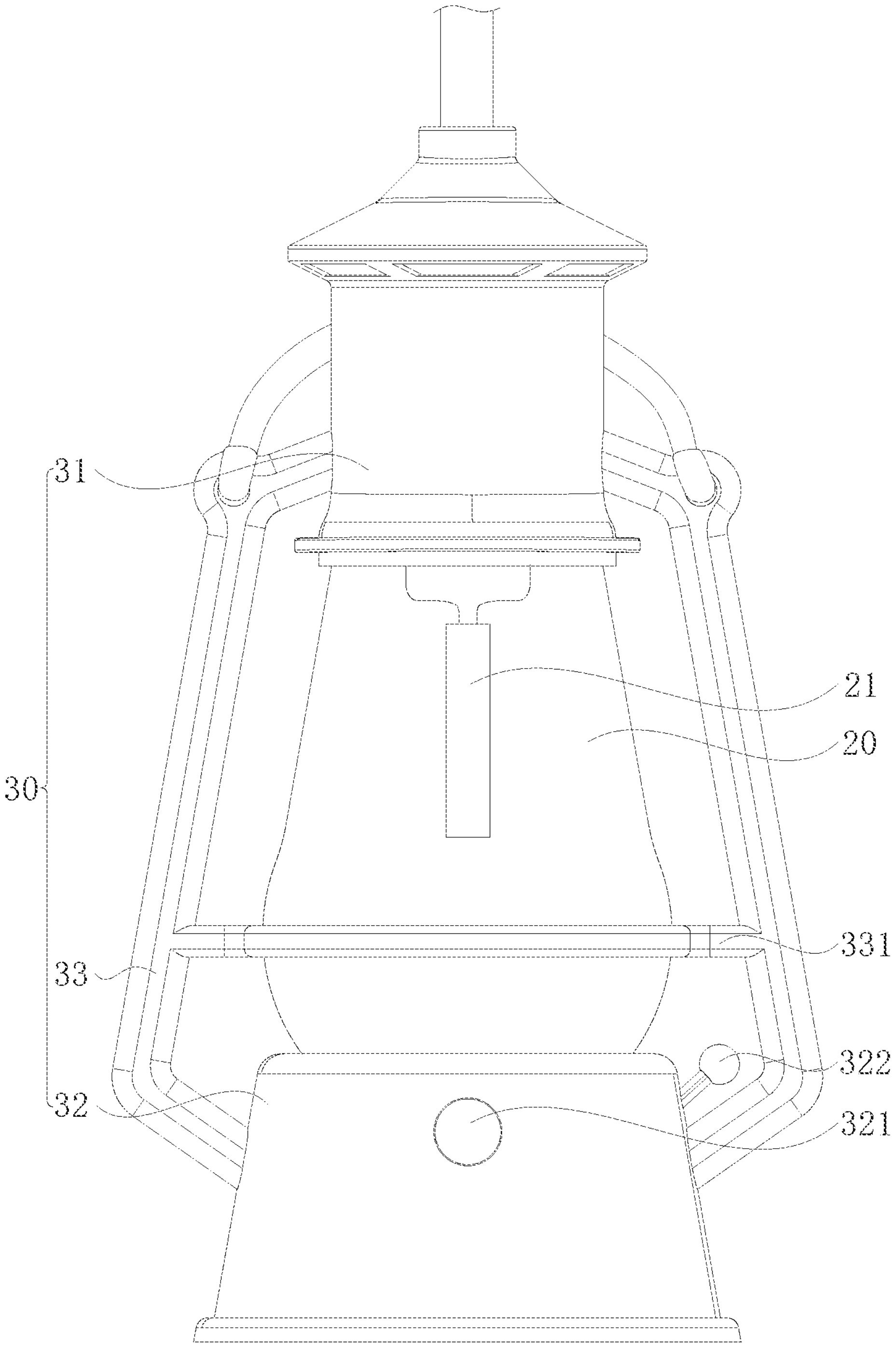
FIG. 3 is an elevation view of the antique LED lamps simulating the oil lamp flame according to an embodiment in the present invention.
Figure 4:
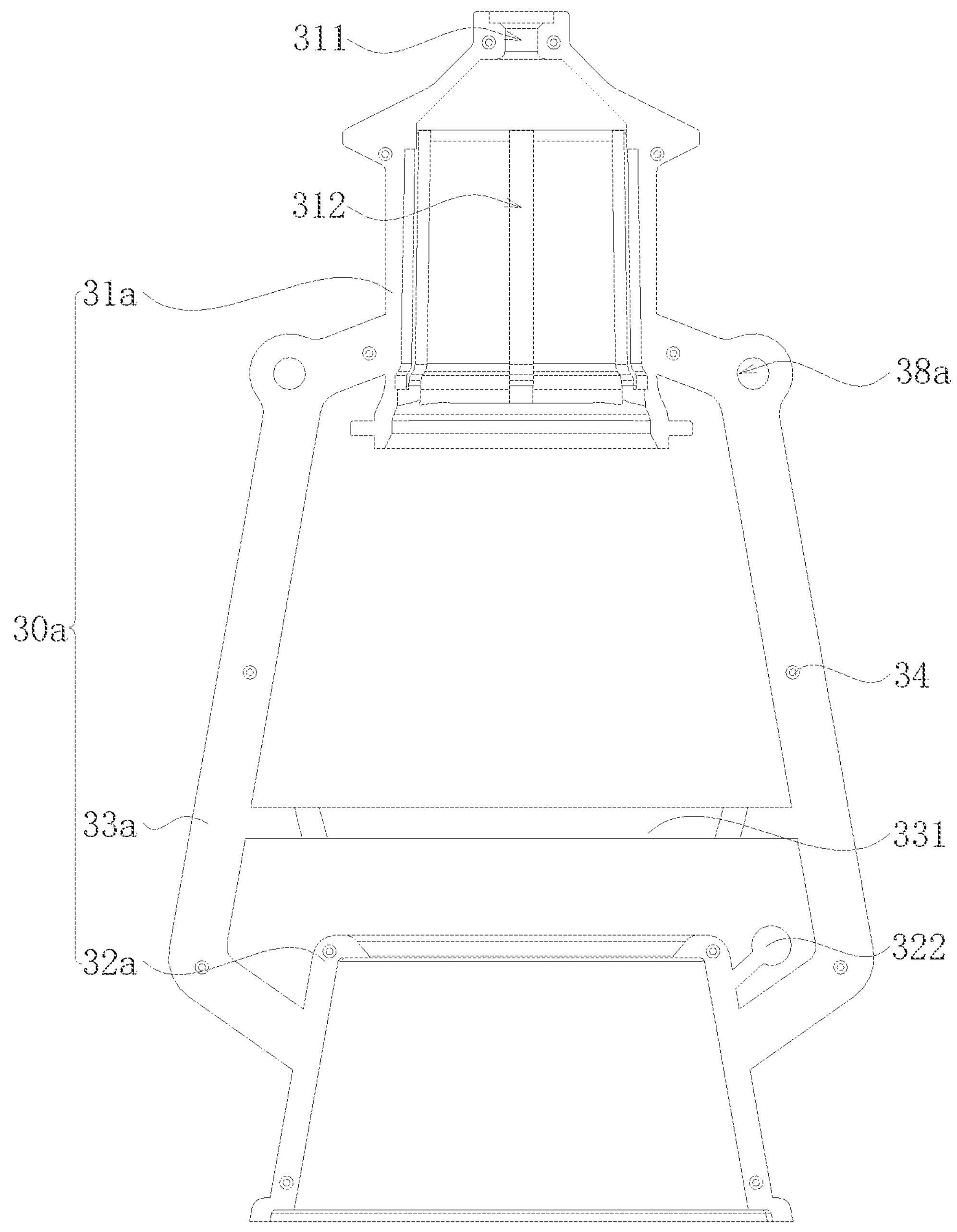
FIG. 4 is an elevation view of the assembling frame of the antique LED lamps simulating the oil lamp flame according to an embodiment in the present invention.

In another embodiment in the present invention, referring to FIGS. 1-3, a side surface of the base 32 is provided with an adjusting switch 321, which is used to simulate the switch of oil lamp.

In another embodiment in the present invention, referring to FIGS. 1-4, an outer surface of the base 32 is provided with a decoration piece 322 so as to further improve accessories of the antique LED lamp simulating the oil lamp flame, thereby improving the degree of similarity between the antique LED lamp simulating the oil lamp flame and the oil lamp.

In another embodiment in the present invention, referring to FIG. 1, the bulb 20 has an thread base, the inner surface of the lamp holder 10 is provided an outer thread matched with the thread base, thereby achieving the rotatably connection of the bulb 20 and the lamp holder 10.

Figure 7:
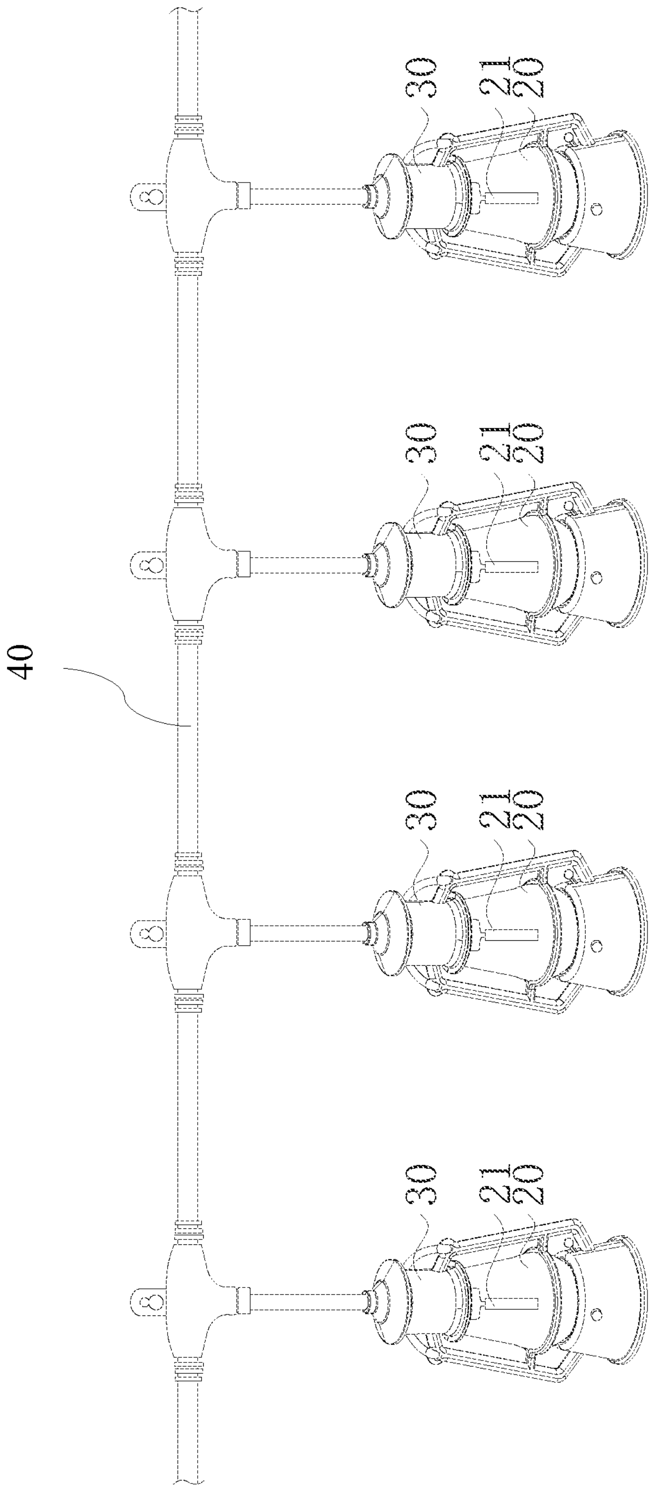
FIG. 7 is a perspective view of the string lamp according to an embodiment in the present invention.

Referring to FIG. 7, the antique LED lamp simulating the oil lamp flame can be connected by the wire 40 according to the requirement of the users to form a string lamp. The wire 40 is electrically connected with a power supply switch to control all of the antique LED lamps to turn on or off and the light emitting frequency and brightness thereof.

The foregoing descriptions are merely exemplary embodiments of the present invention but are not intended to limit the present invention. Any modification, equivalent replacement, and improvement made within the spirit and principle of the present invention shall belong to the protection scope of the present invention.

The invention claimed is:

1. An antique LED lamp simulating an oil lamp flame, comprising a LED light-emitting plate, a lamp holder, a bulb, and a main frame; said bulb and said lamp holder are arranged in said main frame, said bulb is rotatably mounted on a bottom of said lamp holder, and said lamp holder is electrically connected with said bulb; a wire passes said main frame to electrically connected with said lamp holder; said LED flame emitting plate is arranged in said bulb and is connected to a control chip; said control chip is internally provided with an IC program, and said IC program adjusts a light emitting frequency and brightness of said LED emitting plate to simulate flickering and emitting light like flames;

wherein two assembling frames are spliced in a mirror-symmetrical manner to form said main frame; each of said two assembling frames comprises a half top cover, a half base, and two half connection rods; said two half connection rods are symmetrically arranged at two sides of said half base and said half top cover to connect said half base and said half top cover; after said two assembling frames are assembled, said two half top covers are assembled to form a top cover of said main frame, said two half bases are assembled to form said base of said main frame, and said four half connection rods are assembled in pairs to form two connection rods of said main frame; said lamp holder is mounted in said top cover and a bottom of said bulb is located an upper part of said base of said main frame.

2. The antique LED lamp simulating said oil lamp flame according to claim 1, wherein a bottom surface of said top cover is provided with a mounting slot, a top surface thereof is provided with a wire hole communicated with said mounting slot, said lamp holder is mounted in said mounting slot.

3. The antique LED lamp simulating said oil lamp flame according to claim 2, wherein said top surface of said top cover is provided with a groove for sealing and injecting glue, and said wire hole is located inside said groove.

4. The antique LED lamp simulating said oil lamp flame according to claim 2, wherein an inner wall of said mounting slot is provided with multiple positioning slots at intervals, an outer wall of said lamp holder is provided with positioning bump at intervals, said positioning bump respectively snap-fitted with said positioning slots.

5. The antique LED lamp simulating said oil lamp flame according to claim 1, wherein said two half top covers are integrally formed by injection molding to form said top cover, a fixing piece is arranged between two top parts of said two half connection rods of said same assembling frame, and said two fixing pieces attached to an outer surface of said top cover.

6. The antique LED lamp simulating said oil lamp flame according to claim 5, wherein said outer surface of said top cover is provided with a closed clamping slot, and two of said fixing pieces are clamped in said closed clamping slot.

7. The antique LED lamp simulating said oil lamp flame according to claim 1, wherein each of said two assembling frames further comprises a limiting strip, being connected to said two half connecting rods; said limiting strip comprises two half-abutting portions and an arc portion; said two half-abutting portions are respectively connected to said two half connecting rods, and said arc portion is connected to said two half-abutting portions; after said two assembling frames are assembled, said two half-abutting portions of said two assembling frames are spliced together side by side, said two arc-shaped portions are spliced together into an annular ring, and said annular ring positions said bulb around a maximum outer diameter of said bulb.

8. The antique LED lamp simulating said oil lamp flame according to claim 1, wherein an upper portion of each of said two half connecting rods is provided with a half through hole, after said four half connecting rods are assembled in pairs, said four half through holes are butt-jointed in pairs to form two through-holes; and said two through-holes are used for two ends of a handle to pass through and are connected to said handle.

9. A string lamp, comprising multiple of said antique LED lamps simulating said oil lamp flame according to claim 1, said antique LED lamps simulating said oil lamp flame are connected with said wire, said wire is electrically connected with a power supply switch to control all of said antique LED lamps to turn on or off and said light emitting frequency and brightness thereof.

* * * * *